(12) United States Patent
Levinzon

(10) Patent No.: US 6,987,654 B2
(45) Date of Patent: Jan. 17, 2006

(54) ELECTROSTATIC DISCHARGE CIRCUIT

(75) Inventor: Felix A. Levinzon, Mission Viejo, CA (US)

(73) Assignee: Endevco Corporation, San Juan Capistrano, CA (US)

( * ) Notice: Subject to any disclaimer, the term of this patent is extended or adjusted under 35 U.S.C. 154(b) by 230 days.

(21) Appl. No.: 10/307,211

(22) Filed: Nov. 27, 2002

(65) Prior Publication Data

US 2004/0100744 A1    May 27, 2004

(51) Int. Cl.
*H02H 9/00*    (2006.01)

(52) U.S. Cl. ...................................................... 361/56

(58) Field of Classification Search .................. 361/56, 361/91.1, 111; 360/323
See application file for complete search history.

(56) References Cited

U.S. PATENT DOCUMENTS

| | | | | |
|---|---|---|---|---|
| 4,085,349 A | * | 4/1978 | Farstad ........................ | 310/319 |
| 5,517,183 A | * | 5/1996 | Bozeman, Jr. .............. | 340/669 |
| 5,539,598 A | | 7/1996 | Denison et al. ............. | 360/323 |
| 5,903,415 A | | 5/1999 | Gill ............................ | 360/323 |
| 6,091,082 A | | 7/2000 | Thomas et al. .............. | 257/77 |
| 6,259,573 B1 | | 7/2001 | Tsuwako et al. ............. | 360/46 |
| 6,445,039 B1 | * | 9/2002 | Woo et al. .................. | 257/355 |

* cited by examiner

*Primary Examiner*—Ronald Leja
(74) *Attorney, Agent, or Firm*—Paul Davis; Heller Ehrman LLP

(57) ABSTRACT

A circuit includes at least one input node, at least one output node, a signal conditioning circuit, and an electrostatic discharge (ESD) circuit. The signal conditioning circuit is characterized by a transfer function and adapted to receive input signals from and provide conditioned output signals to the input and output node(s), respectively. The signal conditioning circuit processes the input signal and outputs the conditioned output signal as a function of the transfer function. The ESD protection circuit is adapted to the signal conditioning circuit (i) to suppress electrostatic discharge signals applied to at least one of the input or output node(s) to levels electrically non-destructive to the signal conditioning circuit and (ii) to interact with the signal conditioning circuit in a manner substantially maintaining the transfer function.

27 Claims, 13 Drawing Sheets

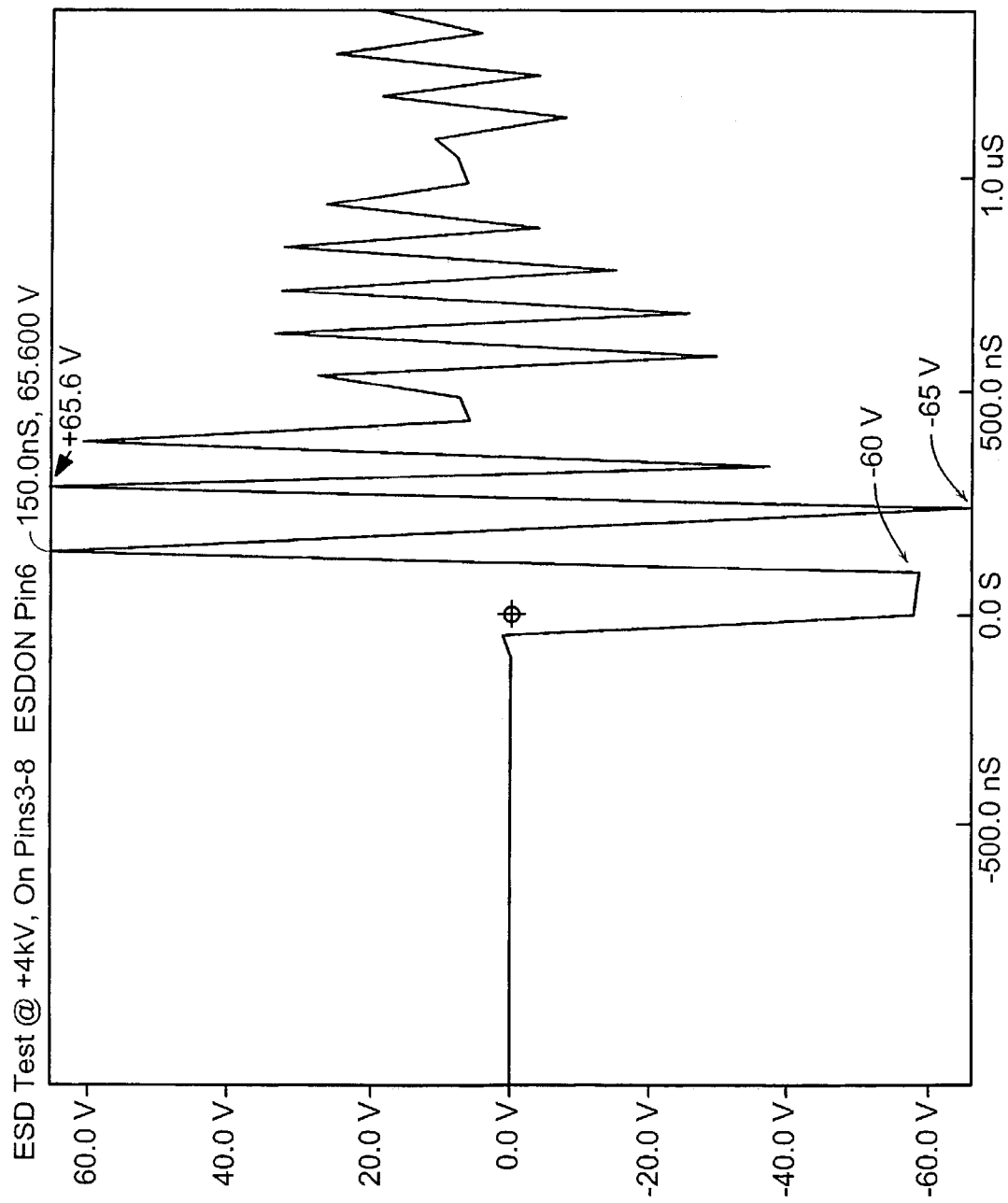

ELECTROSTATIC DISCHARGE CIRCUIT

BACKGROUND

Electrostatic discharge (ESD) causes circuit failures. ESD may be caused by current surges or arcing due to lightning, human contact (i.e., charged non-conductive element contacting a conductive element), or "hot" connect or disconnect of circuits via cable connectors, Typically, ESD reaches a circuit via pins at the cable level, circuit board level, or chip level. ESD pulses cause power, high voltage, or current spikes (i.e., power surges) that can damage electronics that are not equipped to dissipate the power or withstand peak voltages or currents.

Some classes of ESD protection circuits include semiconductor layering schemes (U.S. Pat. No. 6,091,082), voltage clamps (U.S. Pat. Nos. 6,259,573 and 5,903,415), and resistive bleed circuits (U.S. Pat. No. 5,539,598).

SUMMARY

Typical sensors have been protected against ESD inadequately. Some protection techniques affect functionality of an ESD protected circuit in the sensors. Thus, there is a need for improved protection that effectively maintains the transfer function of the ESD protected circuit.

According to the principles of the present invention, inventive circuitry includes at least one input node, at least one output node, a signal conditioning circuit, and an electrostatic discharge protection circuit. The signal conditioning circuit is characterized by a transfer function and is adapted to receive input signals from and provide conditioned output signals to the input and output node(s), respectively. The signal conditioning circuit processes the input signal and outputs the conditioned output signal as a function of the transfer function. The electrostatic discharge protection circuit is adapted to the signal conditioning circuit (i) to suppress electrostatic discharge signals applied to at least one of the input or output node(s) to levels (e.g., voltage, current, or frequency) electrically non-destructive to the signal conditioning circuit and (ii) to interface with the signal conditioning circuit in a manner that substantially maintains the transfer function.

In one embodiment, the electrostatic discharge protection circuit suppresses electrostatic discharge signals greater than 2000 Vpp. In another embodiment, the electrostatic discharge protection circuit may suppress electrostatic discharge signals up to about 4000 Vpp.

The circuitry may further include a transducer connected to the input node(s) to provide the input signal. In one embodiment, the transducer is an accelerometer.

The signal conditioning circuit may include a high impedance input stage, such as a charge amplifier.

The electrostatic discharge protection circuit may include at least one capacitor, which may be coupled to the signal conditioning circuit at the input or output node(s). The electrostatic discharge protection circuit may be absent non-linear circuit elements. At least one of the capacitors may have capacitance values matching a capacitance value of a transducer providing the input signal.

The signal conditioning circuit may include an input stage having an operational amplifier, where the capacitor(s) may be electrically connected between the input terminals of the operational amplifier.

The circuitry may be stimulated by the electrostatic discharge in a manner producing an oscillation having a high frequency. The oscillation may be measurable at the input or output terminal(s) or may occur within sections of or active circuits within. The electrostatic discharge protection circuit may reduce a peak amplitude of the oscillation or reduce the frequency of oscillation.

The circuitry may be used to measure vibration of an aircraft engine during operation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6C is a waveform diagram captured at an input node of the circuitry of FIG. 6A;

DETAILED DESCRIPTION

A description of preferred embodiments of the invention follows. The preferred embodiments will be described herein in relation to an aircraft environment, and, in particular, a military aircraft environment.

Figure 1:
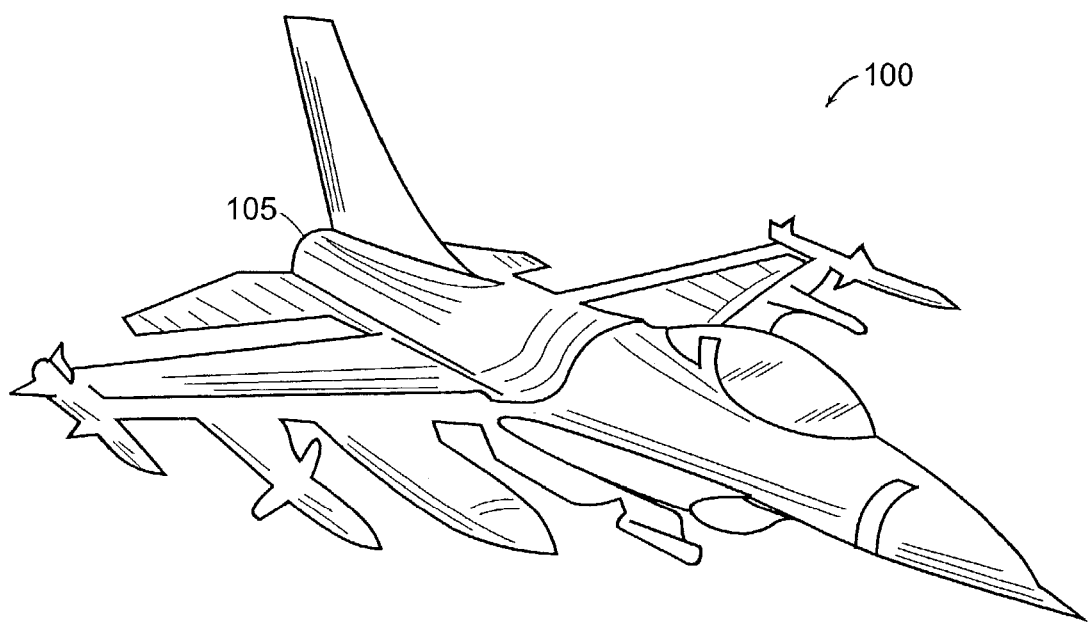
FIG. 1 is a diagram of a military aircraft in which an embodiment of the present invention may be employed.

FIG. 1 is a graphical diagram of an example system in which an electrostatic discharge (ESD) circuit according to the principles of the present invention may be employed to protect an electronic circuit, such as environment sensor circuitry. The system, in this case, is a military aircraft 100.

The aircraft 100 includes a jet engine 105 that is subject to a wide dynamic of environmental conditions, including high temperature and vibration. The environmental conditions may be monitored by a system controller, which receives input from environmental sensors. One such environmental sensor is a vibration sensor.

Figure 2:
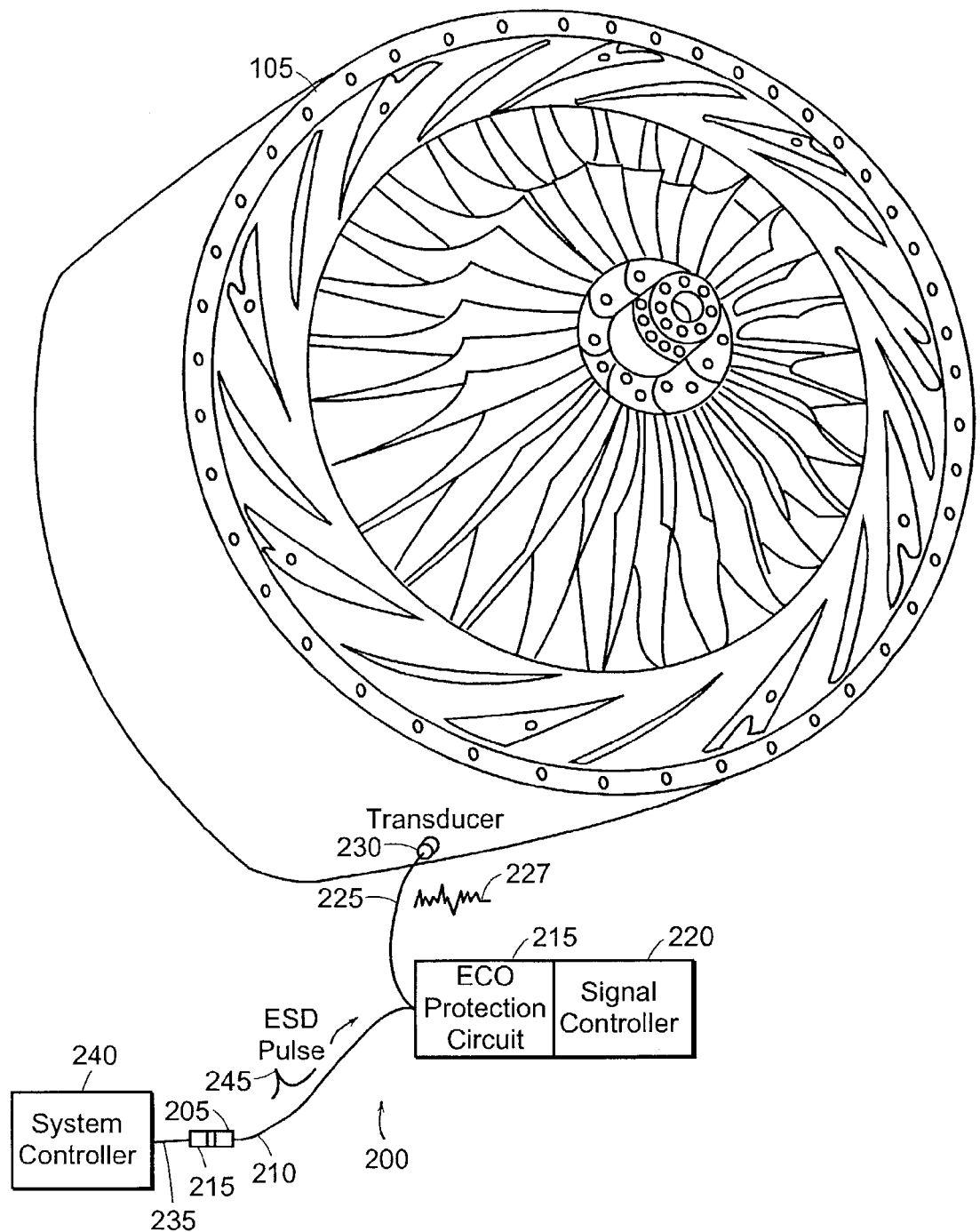
FIG. 2 is a diagram of a jet engine of the aircraft of FIG. 1 in which a vibration sensor, having an ESD protection circuit adapted to a circuit in the vibration sensor according to the principles of the present invention, measures vibration of the jet engine.

FIG. 2 is a graphical diagram of the jet engine 105 and a vibration sensor 200 used to measure the vibration of the jet engine 105. The vibration sensor 200 includes a transducer 230 and signal conditioner 220. The transducer 230, such as an accelerometer, is mechanically connected to the jet engine 105. The transducer 230 converts the sensed environmental condition (e.g., a mechanical vibration) to an electrical charge signal 227 in a typical manner. The electrical charge signal 227 is conveyed to a signal conditioner 220 via a cable pigtail 225.

A system controller 240 may communicate with the signal conditioner 220 via cables 235 and 210. The interface cables 235 and 210 may be electrically connected via connectors 215 and 205 that are designed to operate in a harsh environment, such as experienced by the military aircraft 100.

The signal conditioner 220 includes electrical components subject to damage caused by electrostatic discharge. The electrostatic discharge may be generated in various ways, such as lightning, human contact, or "hot" connects or disconnects during system test and integration phases of building the aircraft 100. For example, an ESD pulse 245 may be delivered to the signal conditioner 220 via the interface cables 235 and 210. Alternatively, the ESD pulse 245 may occur prior to system assembly (e.g., circuit board functional testing) or during system test and integration of the signal conditioner 220 following interface cable 210 connection to the signal conditioner 220.

Figure 3:
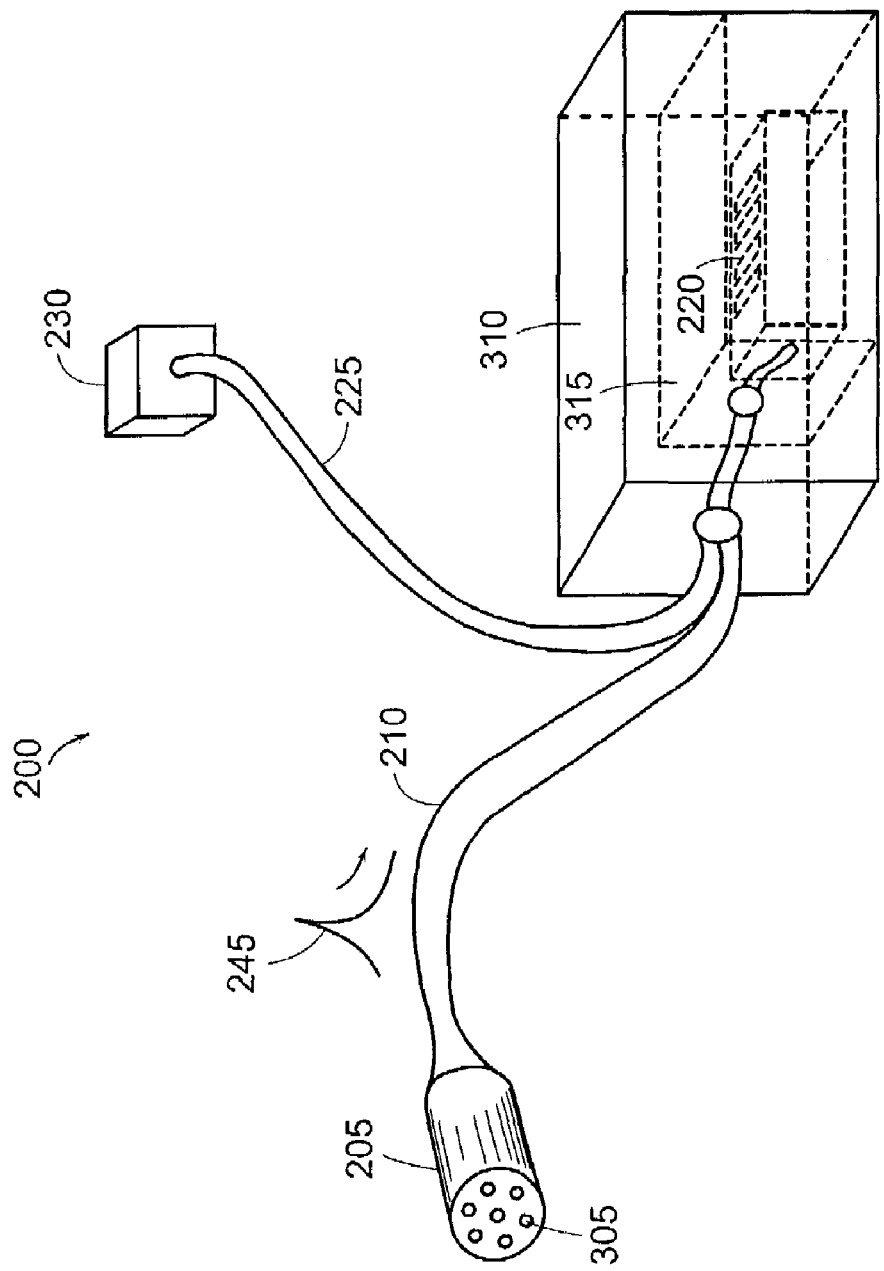
FIG. 3 is a mechanical diagram of the circuitry of FIG. 2.

FIG. 3 is a mechanical diagram of the vibration sensor 200. In this embodiment, the signal conditioner 220 resides in a protective box 315 that is electrically isolated from a larger case 310.

The electrical isolation may be provided by non-conductive standoffs, rubber, epoxy, and so forth. The electrical isolation typically provides at least 20 kV protection for the signal conditioner 220.

The pigtail cable 225 electrically connecting the transducer 230 to the signal conditioner 220 enters through the case 310 and the protective box 315. The interface cable 210 that connects the signal conditioner 220 to the system controller 240 includes a connector 205 having interface pins 305. The pins connect to associated wires in the interface cable 210 that provide the electrical conduction means through which signals, including an electrostatic discharge pulse 245, travel from the system controller 240 through the cable 210 to cause damage to the signal conditioner 220.

Figure 4:
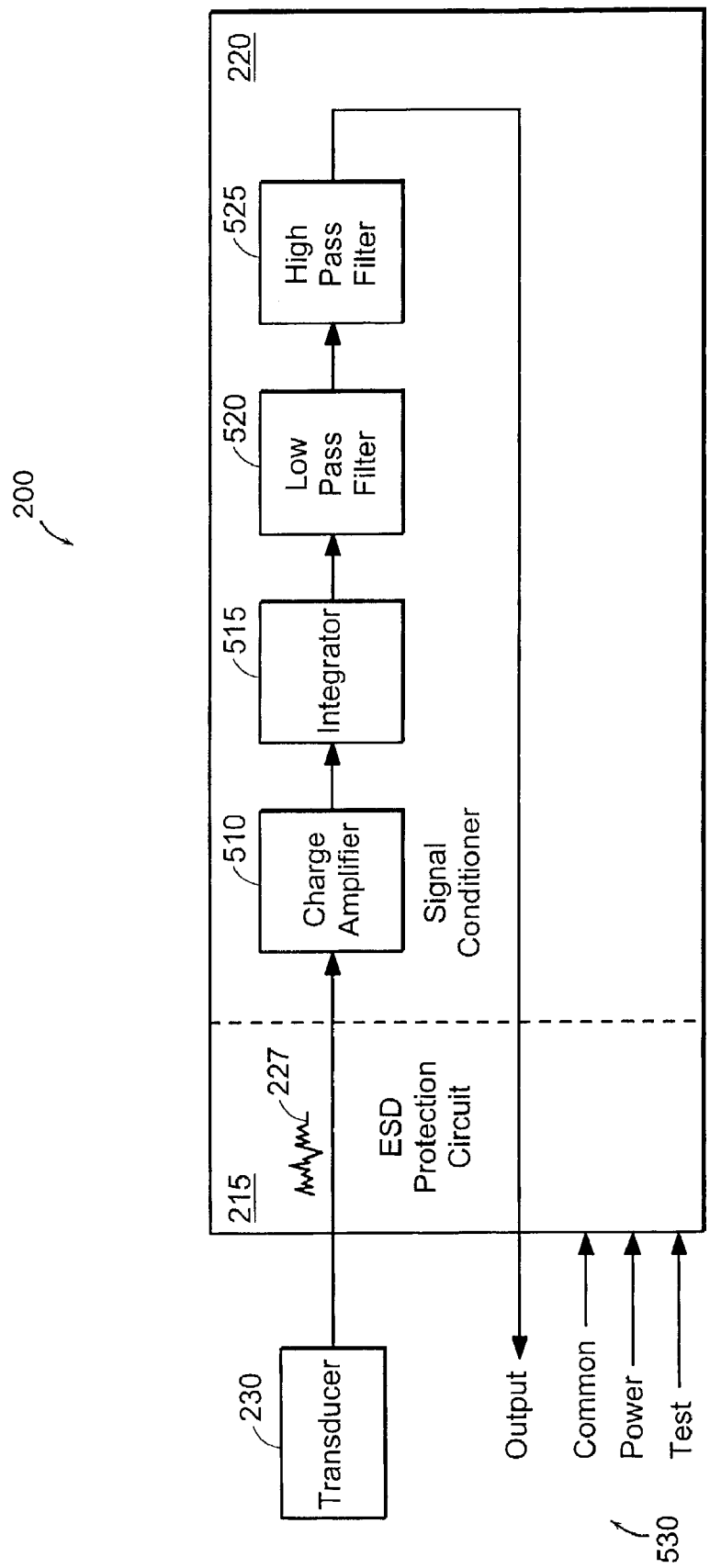
FIG. 4 is a block diagram of the circuitry of FIG. 2.

FIG. 4 is a block diagram of the sensor 200. The transducer 230 provides an electrical charge signal 227 to the signal conditioner 220. The ESD protection circuit 215 may protect the signal conditioner 220 by processing the electrical charge signal 227 prior to being received by the signal conditioner 220. The ESD protection circuit 215 may protect the signal conditioner 220 by processing the electrical charge signal 227 after being received by the signal conditioner 220. The electrical charge signal 227 may travel a path not susceptible to damage by the ESD pulse 245, so the electrical charge signal 227 may not be processed by the ESD protection circuit 215. In other words, the ESD protection circuit 215 may precede the signal conditioner 220, be an integral part of the signal conditioner 220, or be applied to select areas or interface pins 305 of the signal conditioner 220.

The signal conditioner 220 may include a charge amplifier 510, integrator 515, low pass filter 520, and high pass filter 525. In this exemplary signal conditioner 220, the output signal from the high pass filter 525 is the output signal from the signal conditioner 220. The output signal may pass through the ESD protection circuit 215 before being provided to the system controller 240. The output signal is among multiple interface signals 530 communicated to or provided by the system controller 240, including, for example, a common (i.e., ground reference), power (e.g., +/−15V), and test signal.

In this embodiment, the output signal from the signal conditioner 220 is a velocity representation for the case where the transducer 230 is an accelerometer. Transformation from acceleration to velocity is provided through the use of the integrator 515. The charge amplifier 510 converts the electrical charge signal 227 provided by the transducer 230 into a voltage for the integrator 515 to integrate. The low pass filter 520 and high pass filter 525 condition the velocity signal to remove electrical noise and provide proper amplification in a predetermined frequency range. The signal conditioner 220 may be more vulnerable to the ESD pulse 245 because of the high gains provided by the charge amplifier 510, integrator 515, high impedance of the charge amplifier 510, and low output impedance provided by the high pass filter 525.

Because the transducer 230 is connected to the ESD protection circuit 215 and signal conditioner 220 in a "closed" circuit, there is little chance for an ESD pulse to be sourced by the transducer 230. It is more likely that an ESD pulse 245 contacts the electronics of the sensor 200 via one of the interface signals 530. This is shown more clearly in a wiring diagram in FIG. 5.

Figure 5:
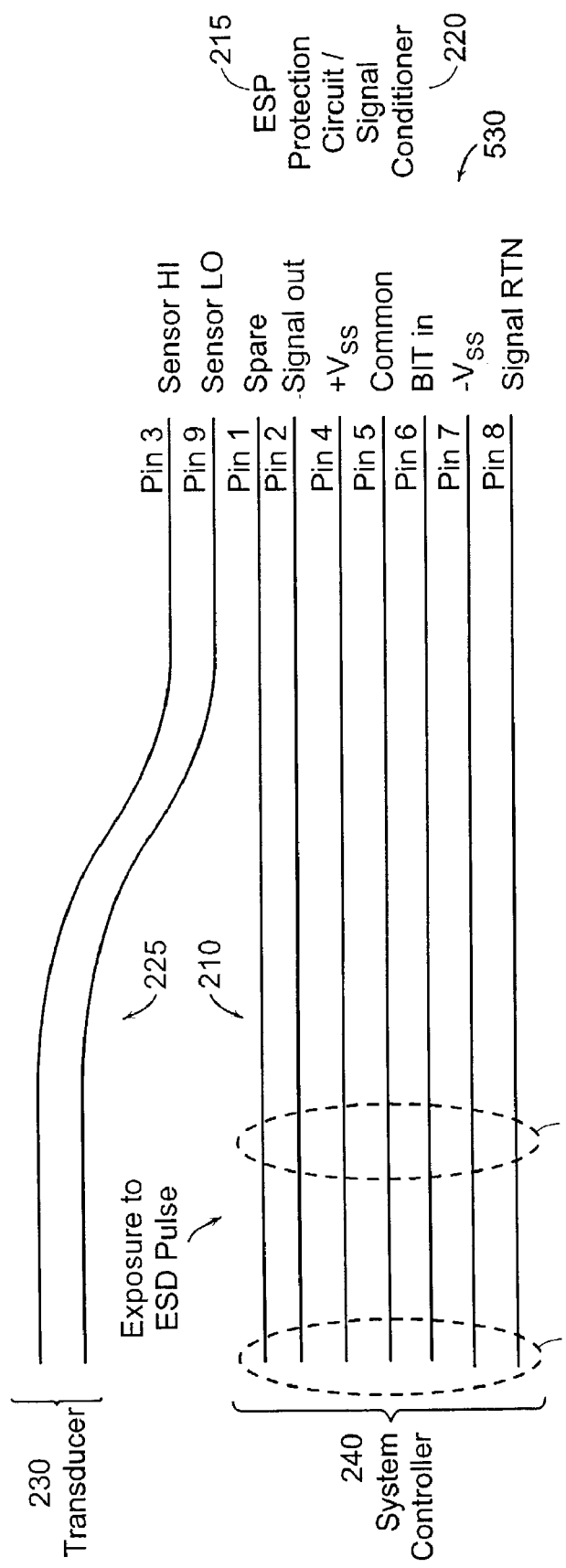
FIG. 5 is a wire diagram of a cable connecting to the circuitry of FIG. 2.

FIG. 5 is a wiring diagram for the interface cable 210 and pigtail cable 225 that connects the signal conditioner 220 and ESD protection circuit 215 to the system controller 240 and transducer 230, respectively. In this example, the transducer 230 connects to pins 3 and 9. The system controller 240 connects to pins 1, 2, and 4–8 via wires 505 to the interface pins 305. Signals carried by the wires 505 connected to the interface pins 305 to which the system controller 240 connects are a signal out, power (i.e., +Vss and −Vss), common, built-in-test (BIT) and signal return. It should be understood that these signals are merely exemplary and may include both analog and digital signals.

The interface cable 210 may be more than 12 inches long to provide some physical distance between the vibration sensor 200 and the system controller 240. The pigtail cable 225, in one embodiment, extends about 0.5 inches from the signal conditioner 220. This allows the transducer 230 to be vibrationally isolated from the signal conditioner 220, but not so long as to have electrical characteristics of the pigtail cable 225 affect the electrical charge signal 227 produced by the transducer 230.

Figure 6A:
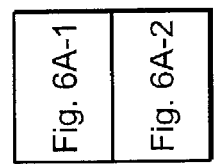
FIG. 6A is a schematic diagram of the circuitry of FIG. 2 without the ESD protection circuit.
Figures 1, 6A:
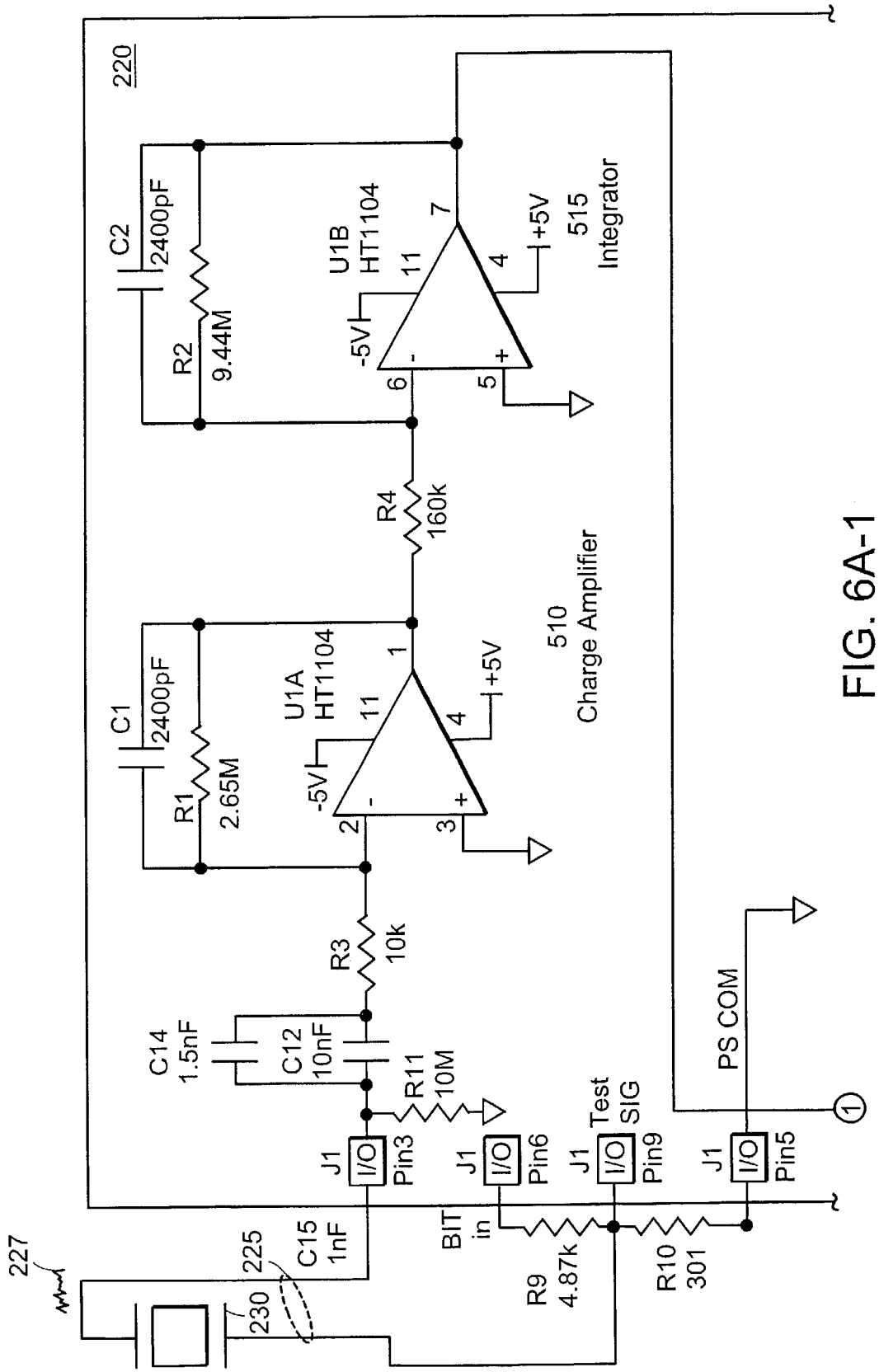
Figures 2, 6A:
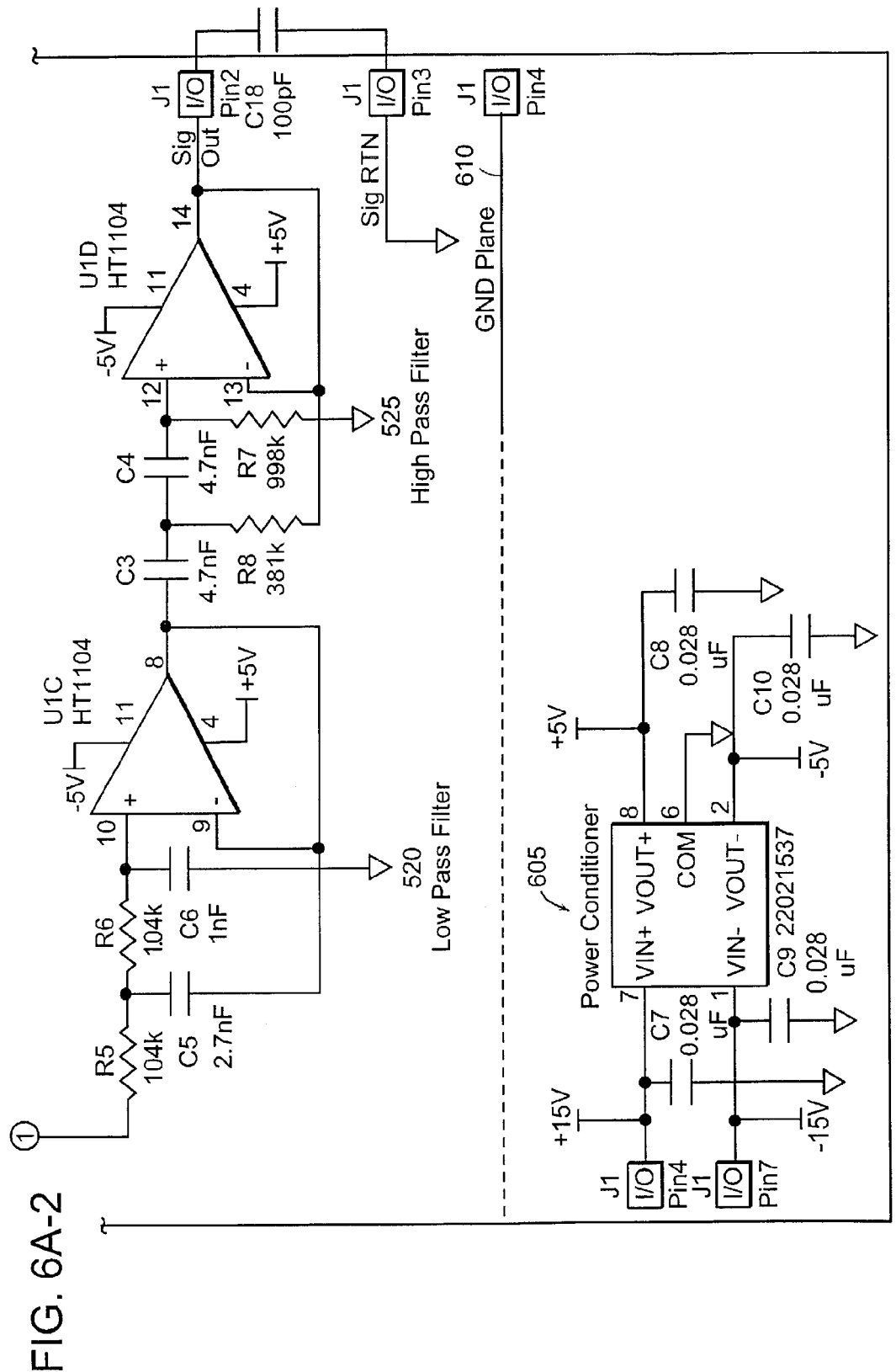

FIG. 6A is a schematic diagram of the vibration sensor 200 that includes the signal conditioner 220 and transducer 230. The transducer 230 connects to the signal conditioner 220 via the pigtail cable 225. The electrical charge signal 227 produced by the transducer 230 is received at connector J1, pins 3 and 5. The electrical charge signal 227 at pin 3 may be capacitively coupled (i.e., high pass filtered) to the charge amplifier 510 by capacitors C14 and C12, which remove bias drift effects of the transducer 230, for example.

The charge amplifier 510 converts the electrical charge signal 227 to a voltage between +/−5V. The voltage produced by the charge amplifier 510 is electrically integrated by the integrator 515, converting the acceleration signal, for example, to a velocity signal. The integrated signal may be low and high pass filtered by a low pass filter 520 and high pass filter 525, respectively. The output signal is presented at connector J1, pin 2, which is capacitively coupled through capacitor C18, which was previously employed to provide ±2 kV ESD protection at the output, to a signal return at connector J1, pin 8. The signal conditioner 220 may also include an on-board power conditioner 605 to convert input power voltages presented at connector J1, pin 4 and J1, pin 7 from a high voltage to a lower voltage, while at the same time filtering the input power voltages to protect the circuitry in the signal conditioner 220.

The signals from the system controller 240 (FIG. 2) are received at connector J1 via the interface cable 210. This means that if the ESD pulse 245 is received via the interface cable 210, it may affect some or all of the circuitry of the signal conditioner 220. Potentially, because pins 4, 5, and 8 are coupled directly to a ground or common 610 of the signal conditioner 220, the ESD pulse 245 can damage any of the circuitry, particularly the active circuitry. Thus, in certain circuits, such as this signal conditioner 220, the electrostatic discharge protection circuit 215 may be strategically placed in a manner that protects the circuitry, yet maintains the functionality and transfer function of the signal conditioner 220. For example, if the ESD protection circuit 215 were to affect the transfer function of the signal conditioner 220, the output signal at J1, pin 2 may cause error in the output signal provided to the system controller 240.

Figure 6B:
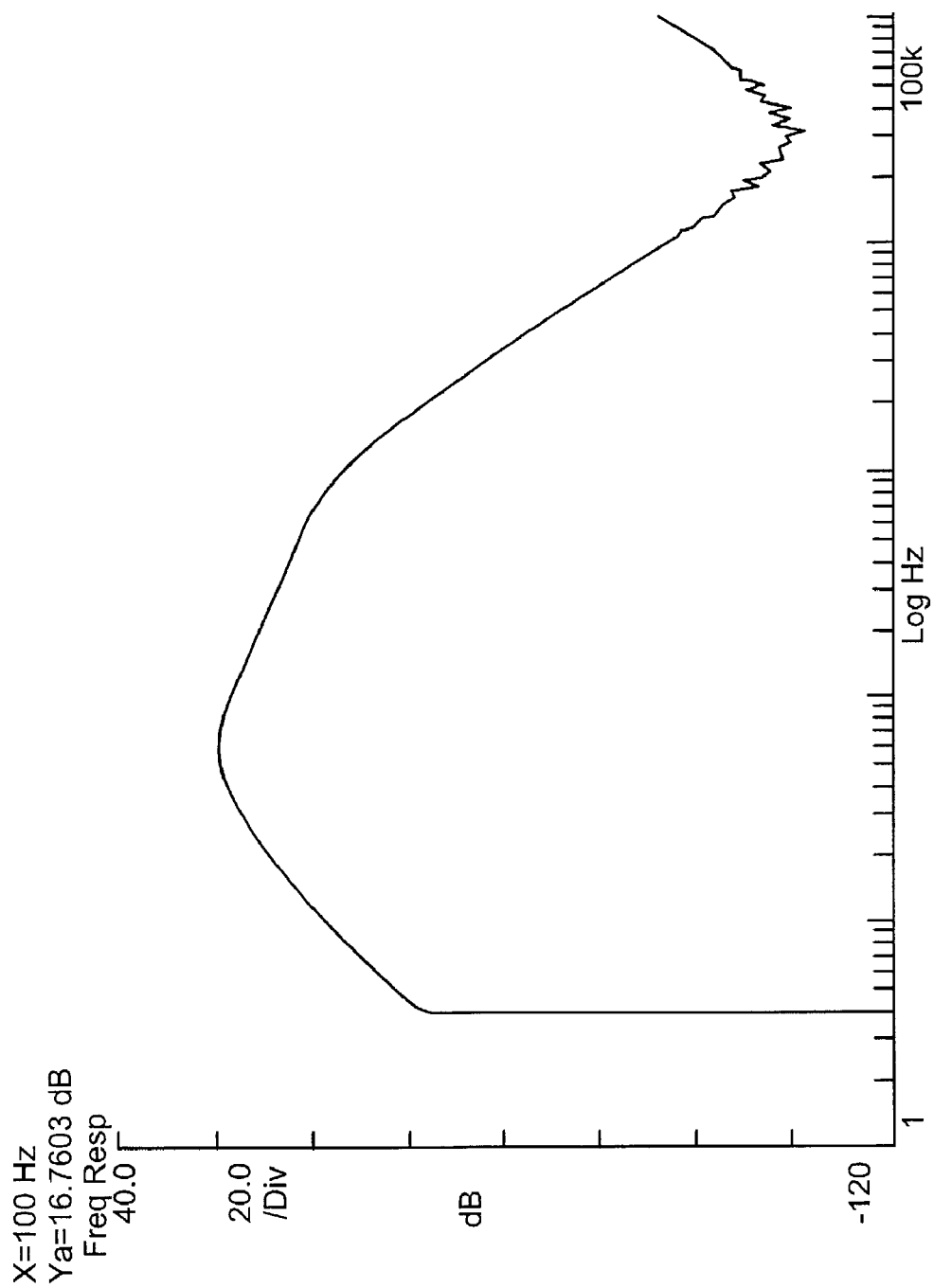
FIG. 6B is a Bode plot representative of transfer function of the circuitry of FIG. 6A.

FIG. 6B is a Bode plot of a transfer function corresponding to the signal conditioner 220 of FIG. 6A. In this particular example, a velocity signal corresponding to the vibration acceleration of the jet engine 105 is anticipated to be between about 70 Hz and 800 Hz. Accordingly, the transfer function has gain in that expected range of velocity signals.

FIG. 6C is a waveform capture measured across J1, pins 3 and 8 (transducer-HI and SIG RTN, respectively) of the signal conditioner 220 resulting from the ESD pulse 245 of ±4 kV applied to J1, pin 6 (BIT N). The ±4 kV ESD pulse 245 causes an oscillation of about 7.7 MHZ, with peak voltage about 130–200 Vpp at about 200 nsec after the application of the ESD pulse 245. Moreover, the oscillation may cause heating in active devices, such as the charge amplifier 510. The heating may cause second order breakdown (i.e., failure) of semi-conductor devices in the operational amplifier of the charge amplifier 510.

Engine environmental sensors for the aircraft 100 (FIG. 1) contain state of the art electronics that are specified to be capable of performing up to +225° C. and withstand ESD pulses up to ±4000 V ESD. Existing sensors, such as the vibration sensor 200 employing the signal conditioner 220 of FIG. 6A, do not meet this ESD requirement. Existing environmental sensors are typically capable of withstanding not more than ±2000 V ESD. Numerous tests with ±4000 V ESD pulses applied to the vibration sensor 200 of FIG. 6A and associated connector pins have led to damage of several components in the signal conditioner 220, which may be implemented in a Pin Grid Array (PGA) package in the vibration sensor 200.

During failure testing and analysis of the vibration sensor 200 of FIG. 6A, application of ±4000 V ESD pulses to each sensor and connector pin of the unprotected circuit were found to have damaged various electronic components, such as resistors and operational amplifiers. Failure analysis of the signal conditioner 220 showed that several components were damaged by the ±4 kV ESD pulse 245. Those components included R3, R11, R9, R10, and U1. Measuring the circuit at pins 3 and 8 during application of the ESD pulse 245 revealed the waveform of FIG. 6C. This 7.7 MHZ oscillation frequency, with amplitudes ranging as high as 120 to 200 volts peak-to-peak (Vpp) depending upon the air gap between the connector pins and the end of an ESD gun tip used to produce the ESD pulses, appears to have been a contributing factor to the damage of the aforementioned circuit elements. This high frequency oscillation may inject power into the active circuitry, such as U1A, that the active circuitry cannot dissipate rapidly enough. The high-frequency oscillations may damage amplifiers, such as the charge amplifier 510, having high open- or closed-loop gain at high frequencies.

Further investigation showed that all pins of the connector were affected, not just certain pins, because cable capacitance between each wire and cable case has a value of 200–230 pF. This is enough capacitance coupling between all pins, except spare pins, for the 7.7 MHZ oscillations to pass from each pin of the cable connector to the unprotected circuit. The ESD protection circuit 215 has been developed to protect the signal conditioner 220 and transducer 230 through the use of additional circuit elements. In one embodiment, the ESD protection circuit 215 includes five capacitors for the circuitry of FIG. 6A. These capacitors prevent circuit damage during ESD testing, where the maximum amplitude of oscillation is decreased from a damaging level of as high as 200 Vpp to a safe level of about 67 Vpp. At this amplitude, all components of the signal conditioner 220 are safe.

This solution has proven to be successful. Three vibration sensors 200 were tested with +4 kV and −4 kV ESD pulses applied five times on each connected pin with no damage to the sensors.

In an analog circuit, such as the signal conditioner 220, ESD protection circuits may have a deleterious effect on the performance of the analog circuit, as measured by comparing the transfer function before and after the ESD protection circuit 215 is applied. An example of a circuit that may change the operational characteristics of the signal conditioner 220 are non-linear circuits, including elements such as diodes, variacs, or transistors. These circuit elements may be used to clip peak pulse amplitudes, but such clipping may cause a system level oscillation, or these non-linear circuit elements may have capacitive and inductive characteristics that may interact with the signal conditioner 220, causing a change in the transfer function of the signal conditioner 220.

The following describes an embodiment of the ESD protection circuit 215 as applied to the signal conditioner 220.

Figures 1, 7A:
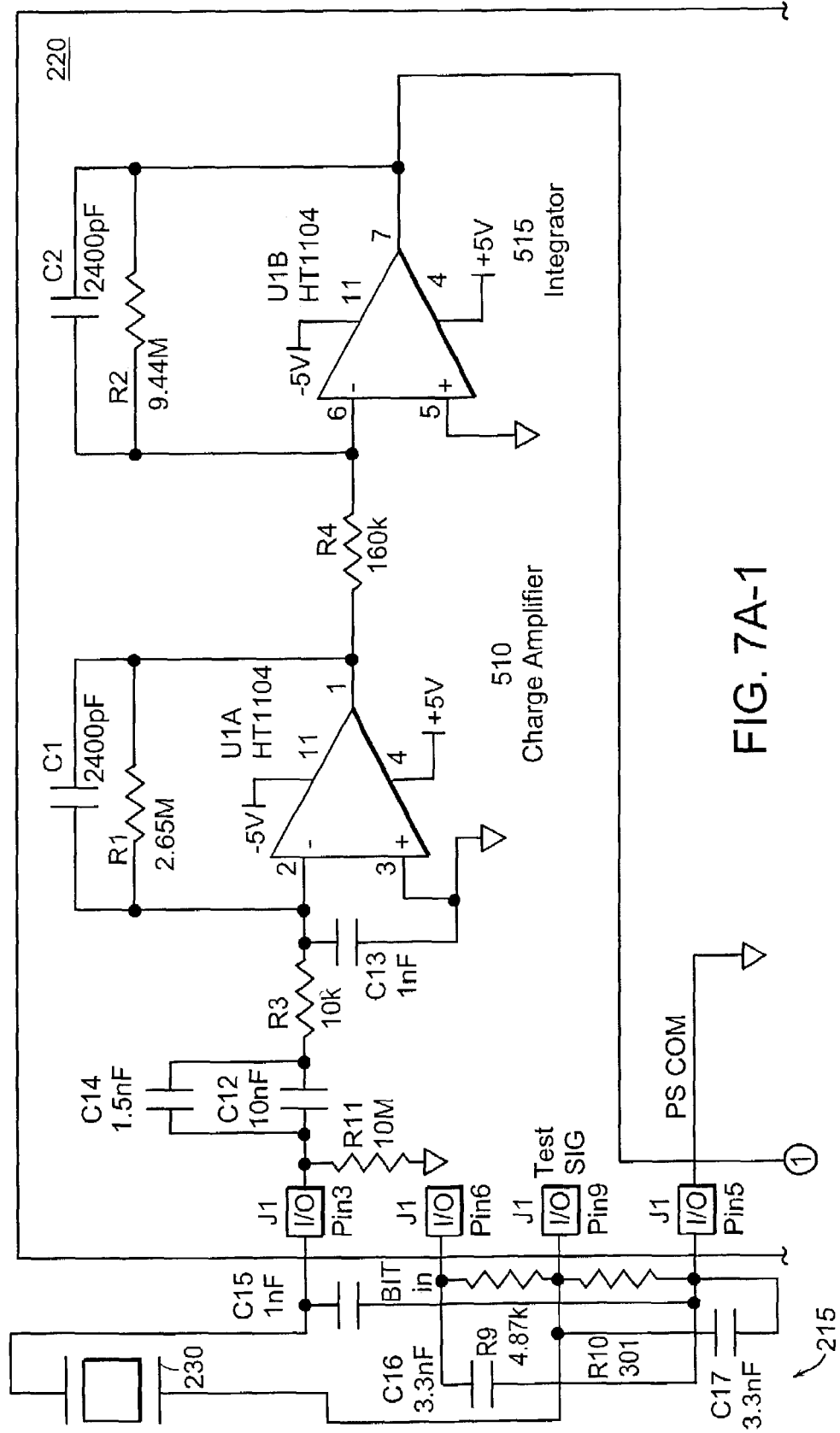
FIG. 7A is the schematic diagram of the circuitry of FIG. 2 with an embodiment of the ESD protection circuit.
Figures 2, 7A:
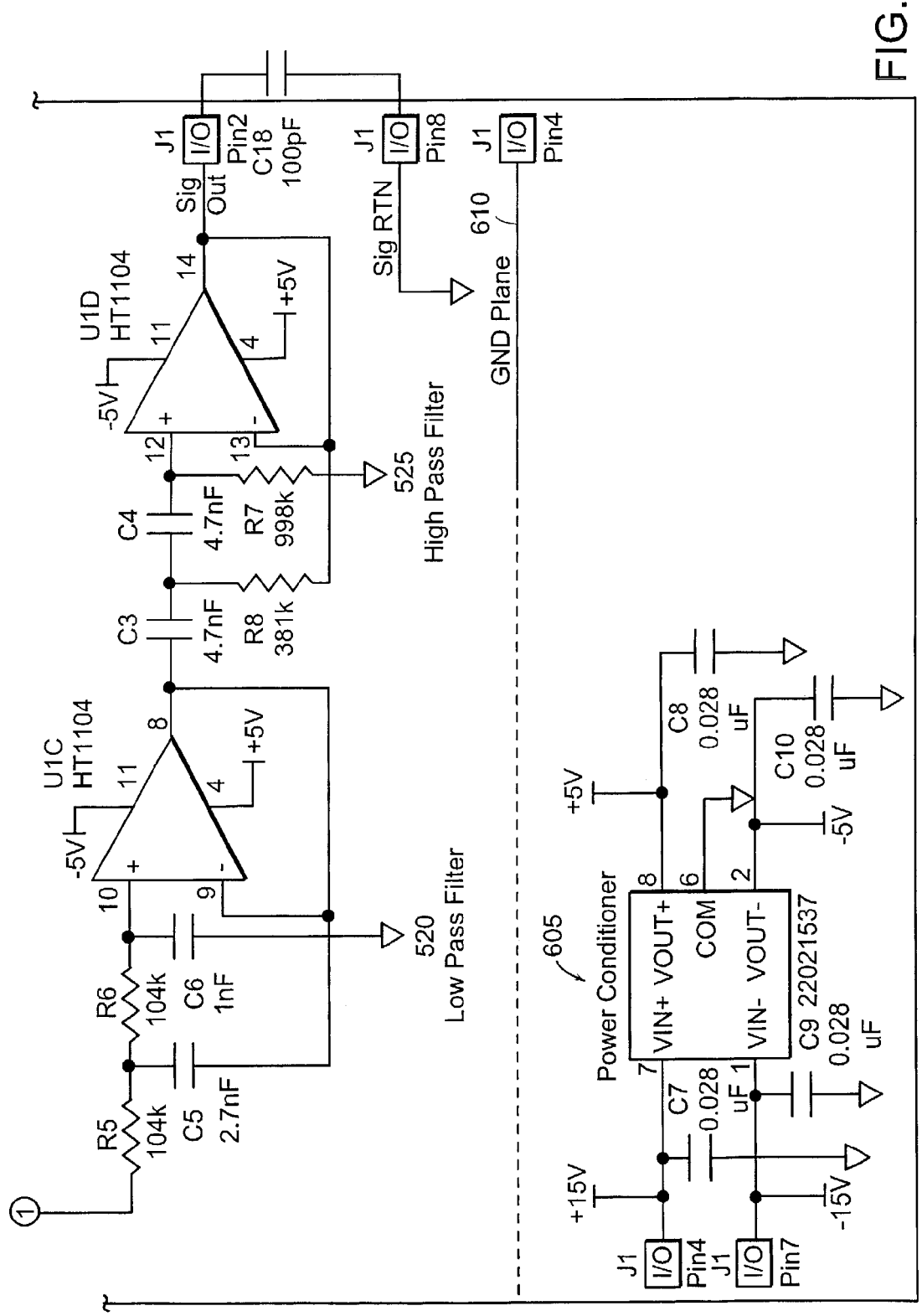

FIG. 7A is a schematic diagram of the signal conditioner 220 to which an embodiment of the ESD protection circuit 215 has been applied to protect the signal conditioner 220 from ±4 kV ESD pulses 245 from damaging the circuitry. Specifically, in this example circuit, resistors R3, R11, R9, and R10 are protected, and operational amplifier U1 is also protected.

To protect these circuit elements, capacitor C16 is electrically connected between pins 6 and 5; capacitor C17 is electrically connected between pins 9 and 5; and capacitor C15 is electrically connected between pins 3 and 5; and capacitor C18 is connected between pins 2 and 8. Capacitor C15 has a capacitance of 1 nF, which is equivalent to the capacitance of the transducer 230 so as not to upset the balance of the associated circuit(s) while protecting the circuit(s) against high oscillation peak voltages or frequencies. Similarly, capacitors C16 and C17 may be selected to reduce the peak of the oscillation signal or the frequency at which the oscillation signal oscillates, while interfacing with the signal conditioner 220 in a manner substantially maintaining the transfer function of the signal conditioner 220.

In addition to the aforementioned capacitors being applied to the signal conditioner 220 as part of the ESD protection circuit 215, capacitor C13 is also applied to the circuit between pins 2 and 3 of U1A. Applying C13 to the operational amplifier U1A provides a low-pass filter in combination with the input resistor R3 and the feedback elements R1 and C1. Thus, the low-pass filter provided by applying C13 to pins 2 and 3 of operational amplifier U1A reduces the amplitude and frequency of the oscillation caused by applying a ±4 kV ESD pulse 245 to the pins (e.g., pin 6) of the signal conditioner 220. Further, frequency at the charge amplifier 510 may cause oscillation in the feedback loop configuration, which may create thermal heating inside the operational amplifier U1A composing the charge amplifier 510 leading to component failure.

As mentioned in reference to FIG. 6A, the capacitor C18 between pins 2 and 8 is part of a previous ESD protection solution that helps to protect the high pass filter 525 (i.e., output stage) from experiencing a high voltage or high oscillation frequency resulting from an application of a ±2 kV ESD pulse 245 at pin 2. In combination with capacitors C16, C17, C15, and C13, or a subset thereof, C18 protects against a ±4 kV ESD pulse.

Figure 7B:
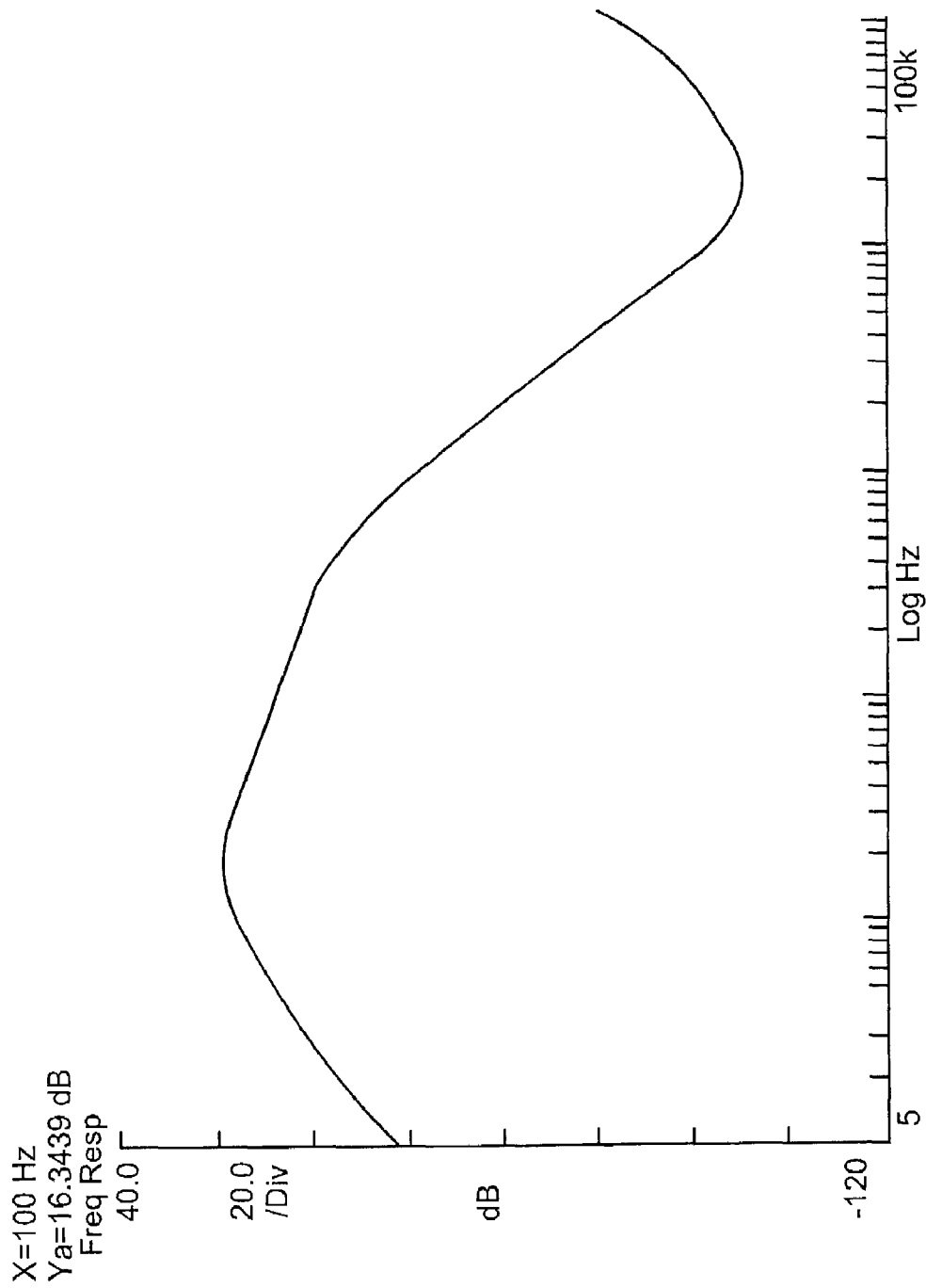
FIG. 7B is a Bode plot representative of the transfer function of the circuitry of FIG. 7A.

FIG. 7B is a Bode plot of the frequency response of the signal conditioner 220 with the ESD protection circuit 215 applied, as discussed in reference to FIG. 7A. As can be determined by comparison with the frequency response of FIG. 6B for the signal conditioner 220 without the ESD protection circuit 215, the transfer function is substantially unaffected by the application of the ESD protection circuit 215. Note the smoothing of the frequency response between about 10 kHz and 100 kHz caused by the addition of the capacitors composing the ESD protection circuit 215 in this embodiment. The frequency response of FIG. 7B, as in the case of FIG. 6B, is measured between pin 2 and pin 3 of connector J1 (i.e., SIG OUT vs. SIG IN).

Figure 7C:
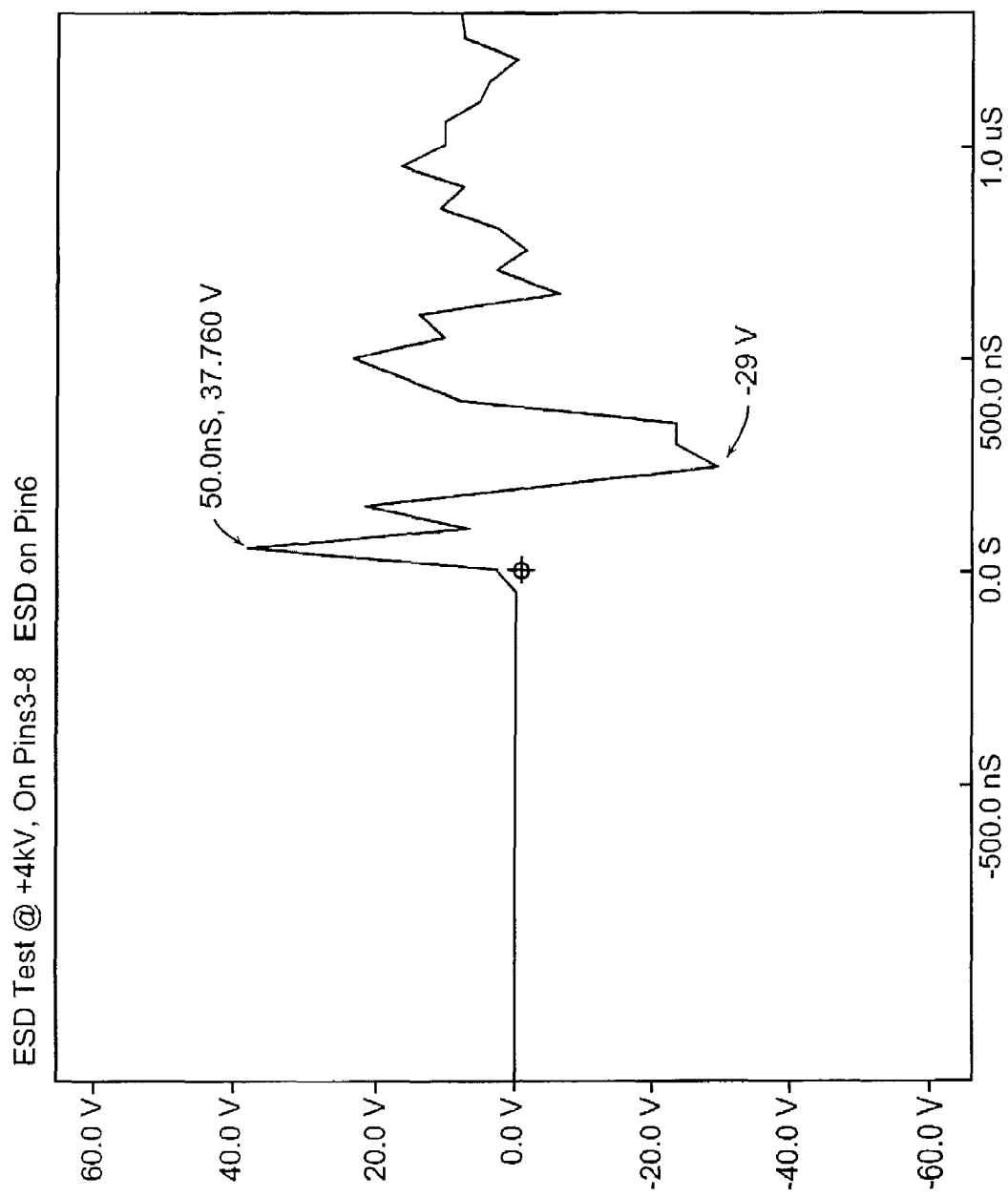
FIG. 7C is a waveform diagram captured at the same input node as FIG. 6C that shows the voltage suppression provided by the ESD protection circuitry of FIG. 7A.

FIG. 7C is a waveform capture of the oscillation between pins 3 and 8 caused by an application of ±4 kV on pin 6 of connector J1. As can be seen in comparison with the corresponding waveform capture of FIG. 6C, the peak of the oscillation has also been reduced from 65 Vpk to 37 Vpk, and the frequency of oscillation has been reduced, thereby reducing the amount of thermal heating in the active component U1. Additionally, because the peak voltage is reduced, the likelihood of damaging other passive or active elements in the signal conditioner 220 is also reduced.

While this invention has been particularly shown and described with references to preferred embodiments thereof, it will be understood by those skilled in the art that various changes in form and details may be made therein without departing from the scope of the invention encompassed by the appended claims.

What is claimed is:

1. A vibration sensor, comprising:
a transducer adapted to generate an electrical signal as a function of vibration;
a signal conditioning circuit, comprising (i) at least one input node, (ii) at least one output node, and (iii) circuit components, the signal conditioning circuit characterized by a transfer function, adapted to receive an input signal from said at least one input node and to provide a conditioned output signal at said at least one output node according to the transfer function; and
an electrostatic discharge (ESD) protection circuit adapted to the signal conditioning circuit (i) to suppress ESD signals greater than about 2000 Vpp applied to said at least one node to levels electrically non-destructive to the signal conditioning circuit and (ii) to interface with the signal conditioning circuit in a manner substantially maintaining the transfer function;
said ESD protection circuit including linear protection elements coupled to components of said signal conditioning circuit sensitive to ESD signals; and one of said linear protection elements coupled to said transducer has an impedance matching an impedance of the transducer to maintain electrical characteristics of the sensor while protecting the transducer and the signal conditioning circuit.

2. The vibration sensor according to claim 1 wherein the electrostatic discharge protection circuit suppresses electrostatic discharge signals up to about 4000 Vpp.

3. The vibration sensor according to claim 1 wherein the transducer is an accelerometer.

4. The vibration sensor according to claim 1 wherein the signal conditioning circuit includes a high impedance input stage.

5. The vibration sensor according to claim 4 wherein the high impedance input stage is a charge amplifier.

6. The vibration sensor according to claim 1 wherein the linear protection circuit elements are capacitors.

7. The vibration sensor according to claim 6 wherein the electrostatic discharge protection circuit is absent non-linear circuit elements.

8. The vibration sensor according to claim 6 wherein at least one of the capacitors has a capacitance value matching a capacitance value of the transducer providing the input signal.

9. The vibration sensor according to claim 6 wherein the signal conditioning circuit includes an input stage including an operational amplifier, at least one of said capacitors being electrically coupled between the input terminals of the operational amplifier.

10. The vibration sensor according to claim 1 wherein the electrostatic discharge protection circuit reduces an oscillation frequency or a peak of an oscillation voltage, caused by the electrostatic discharge signal, at at least one input or output node.

11. The vibration sensor according to claim 1 used to measure vibration of an aircraft engine during operation.

12. The vibration sensor according to claim 1 operated at a temperature greater than about 200° C.

13. The vibration sensor according to claim 1 operated at a temperature up to about 300° C.

14. A method for conditioning a signal, comprising:
receiving a signal from a transducer representative of a vibration;
conditioning the signal according to a transfer function;
suppressing electrostatic discharge (ESD) signals greater than about 2000 Vpp to levels electrically non-destructive to the conditioning and in a manner substantially maintaining the transfer function, the suppressing of ESD signals effectuated by linear elements including at least one having an impedance matching the impedance of the transducer; and
outputting the conditioned signal.

15. The method according to claim 14 wherein the electrostatic discharge signals are as high as about 4000 Vpp.

16. The method according to claim 14 wherein the transducer is an accelerometer.

17. The method according to claim 14 wherein conditioning the signal includes using a high impedance input stage to amplify the signal.

18. The method according to claim 17 wherein amplifying the signal includes charge amplifying the signal.

19. The method according to claim 14 wherein suppressing electrostatic discharge signals includes limiting discharging to capacitively discharging the signal.

20. The method according to claim 19 wherein capacitively discharging the signal occurs absent non-linear circuit elements.

21. The method according to claim 19 wherein capacitively discharging the signal includes using at least one capacitor having a value matching a capacitance value of the transducer providing the signal.

22. The method according to claim 19 wherein conditioning the signal includes actively amplifying the signal.

23. The method according to claim 14 wherein suppressing the electrostatic discharge signals includes reducing an oscillation frequency or a peak of an oscillation voltage.

24. The method according to claim 14 used to measure vibration of an aircraft engine during operation.

25. The method according to claim 14 operating at a temperature more than about 200° C.

26. The method according to claim 14 operating at a temperature up to about 300° C.

27. A vibration sensor including a circuit for conditioning a signal, comprising:

means for receiving the signal;

means for conditioning the signal according to a transfer function;

means for suppressing electrostatic discharge signals to levels electrically non-destructive to the conditioning and in a manner substantially maintaining the transfer function; and means for outputting the conditioned signal.

* * * * *